May 13, 1969     J. N. ELLIS     3,444,405
PERMANENT MAGNET GENERATOR
Filed June 2, 1967     Sheet 1 of 2
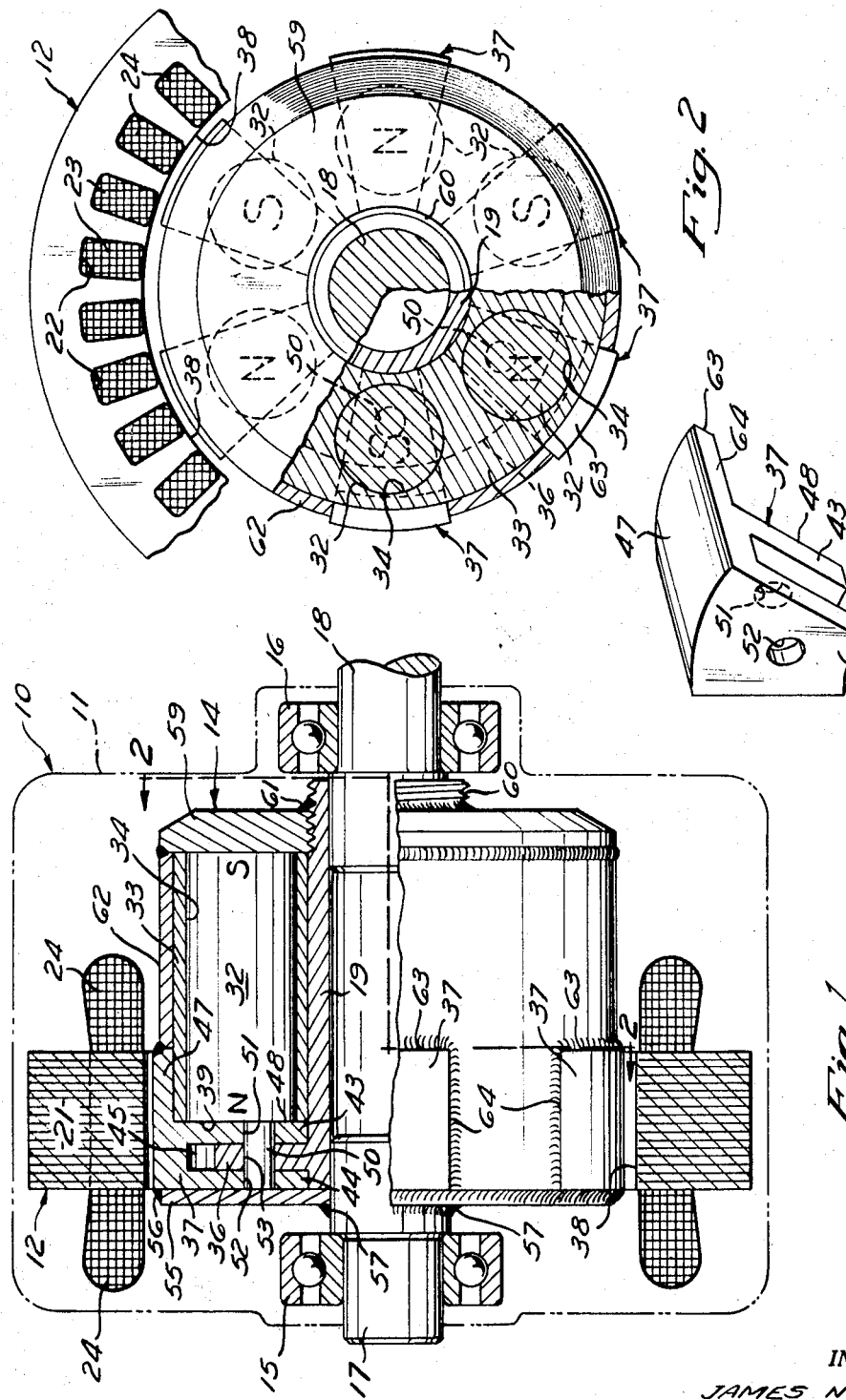
INVENTOR.
JAMES N. ELLIS
BY Bosworth, Sessions,
Herstrom & Knowles
ATTORNEYS

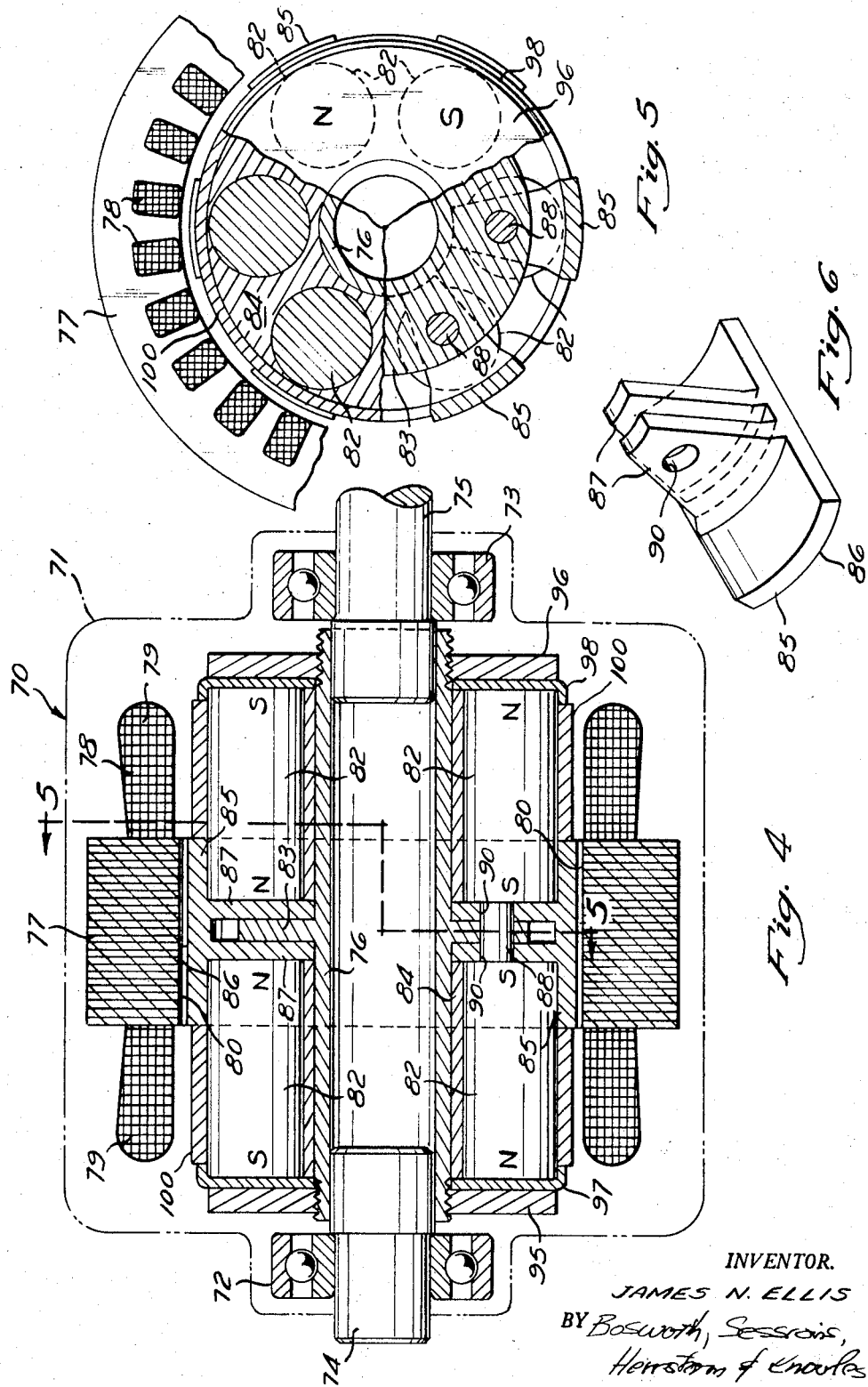

United States Patent Office 3,444,405
Patented May 13, 1969

3,444,405
PERMANENT MAGNET GENERATOR
James N. Ellis, Palos Verdes Peninsula, Calif., assignor to Lear Siegler, Inc., Santa Monica, Calif., a corporation of Delaware
Filed June 2, 1967, Ser. No. 643,177
Int. Cl. H02k 21/16
U.S. Cl. 310—156                           11 Claims

ABSTRACT OF THE DISCLOSURE

A generator in which the flux field is provided by permanent magnets in the rotor with the axes of the magnets parallel to the rotor shaft. The rotor pole faces are provided by pole pieces which have radial portions in contact with ends of the magnets and circumferential pole face portions. An annular stator carrying conventional output windings is employed, the air gap between the rotor pole face portions and the stator being radial.

BACKGROUND OF INVENTION

This invention relates to generators in which the field flux is provided by permanent magnets carried by the rotor of the generator. More particularly, the invention relates to such generators in which the air gap between the rotor and stator is radial.

Permanent magnet generators are well known in the art and in general have fallen into two classes, these being (1) radial air gap generators in which the magnetic axes of the permanent magnets in the rotor extend radially outwardly from the rotor axis, and (2) axial air gap generators in which the permanent magnets in the rotor are disposed with their magnetic axes parallel to the rotor shaft. In prior radial air gap generators with radially extending magnets, the length of the magnets, and accordingly the magneto-motive force supplied by the magnets, is limited by the diameter of the machine and the flux density in the air gap. Hence, the output of the machines is correspondingly limited. In prior permanent magnet machines embodying axially extending magnets, the stator is disposed immediately adjacent the ends of the magnets and the diameter of the stator and the area of the pole faces is limited by the diameter of the rotor. Also, the stator is more expensive to constructe than a conventional stator. Machines of both types are shown in Patent No. 2,719,931 issued Oct. 4, 1955.

SUMMARY OF INVENTION

A general object of this invention is to provide an improved permanent magnet generator that will allow greater output per pound of weight than can be obtained from prior permanent magnet generator designs. Another object is the provision of a permanent magnet generator that embodies a radial air gap and a conventional stator design in which the flux produced by the permanent manets in the rotor is not limited by the rotor diameter. Another ogbject is the provision of a permanent magnet generator that eliminates the disadvantages heretofore inherent in both radial and axial air gap designs. A still further object is the provision of such a generator that lends itself to high speed operation and can be designed for operation under severe conditions and that will be capable of being manufactured at reasonable costs.

Briefly, the invention contemplates the attainment of the foregoing and other objects and advantages by the provision of a radial air gap permanent magnet generator in which the output or armature windings are carried by the stator which may be of conventional structure, and in which the field is produced by permanent magnets mounted in the rotor of the generator with their magnetic axes parallel to the axis of the rotor. The rotor has circumferentially extending pole faces that are provided by pole piece members. The pole piece members have radial portions in contact with the ends of the magnets and circumferential pole face portions that are opposed to the pole faces of the stator across a conventional radial air gap. Each pole piece has a radial portion in contact with the end of a magnet. The magnetic circuit is completed at the opposite ends of the magnets by an annular plate carried by the rotor and composed of mild steel or other suitable ferromagnetic material. It is to be noted that neither the length of the magnets nor the area of the pole faces is limited by the diameter of the rotor, as is the case with prior types of permanent magnet machines. This result is obtained by the provision of pole piece members that have radially extending portions in contact with the ends of the magnets and that have pole face portions extending circumferentially of the rotor and opposed to the pole faces of the stator.

BRIEF DESCRIPTION OF DRAWINGS

In the drawings:
FIGURE 1 is a longitudinal sectional view of a generator embodying a preferred form of the invention;
FIGURE 2 is a fragmentary transverse sectional view, the view being taken as indicated by line 2—2 of FIGURE 1;
FIGURE 3 is a perspective illustrating one of the pole piece members of the machine of FIGURES 1 and 2;
FIGURE 4 is an axial sectional view of a generator made according to another preferred form of the invention;
FIGURE 5 is a fragmentary transverse sectional view of the machine shown in FIGURE 4, the view being taken on the line 5—5 of FIGURE 4; and
FIGURE 6 is a perspective showing one of the pole piece members used with the form of apparatus shown in FIGURES 4 and 5.

DESCRIPTION OF PREFERRED EMBODIMENTS

Referring now to FIGURES 1, 2 and 3 of the drawings, a generator embodying one preferred form of the invention is shown at 10 as comprising a housing 11, which may be of conventional construction and which is illustrated in broken lines, a stator 12 and a rotor 14 disposed within the annular stator. Rotor 14 is supported in conventional manner by bearings 15 and 16 that are mounted in the housing 11 and support stub shafts 17 and 18 which are secured to the tubular central portion 19 of the rotor 14. Shaft 18, which is shown as broken away, may be provided with conventional means for coupling the generator to a source of power such as an aircraft engine.

The housing 11 also supports the stator 12, which may be of conventional annular construction, made up of a stack of laminations 21, slotted as at 22, and provided with conventional output or armature windings 23, the end turns of the windings being shown at 24.

In order to provide the required field flux for the generator, permanent magnets 32 are disposed in the rotor. As shown in FIGURES 1 and 2, the axes of these magnets are uniformly circumferentially spaced around the axis of the rotor and extend parallel to the axis of the rotor. Adjacent magnets face in opposite directions; that is, a magnet having its north pole at one end of the rotor will be adjacent two magnets, each of which has its south pole at the same end of the rotor.

The magnets 32 are preferably supported in a cylindrical member 33 which is composed of a non-magnetic material, preferably a conductive metal such as aluminum. The cylinder 33 is provided with a series of apertures 34 in which the magnets 32 are disposed. The cylinder 33 in turn is supported by the central tubular member 19.

Member 19 has not only a central portion which engages the shafts 17 and 18 and which supports the cylindrical member 33, but also is provided with a radially extending flange 36 which engages the pole pieces 37 as described below. The tubular member 19 and its integrally formed flange 36 are formed from a non-magnetic material. A non-magnetic steel such as 316 stainless steel is a suitable material for this part.

It will be noted that the pole faces 38 of the stator are disposed circumferentially around the rotor whereas the poles of the magnets 32 lie in a radial plane spaced a substantial distance from the pole faces 38 of the stator. In order to provide a low reluctance path from the ends of pole faces 39 of the magnets to a radial air gap adjacent the pole faces 38 of the stator, the pole pieces 37, one of which is illustrated in FIGURE 3, are employed. Each pole piece 37 has an inner, radially extending portion 43 and an outer, radially extending portion 44 which between them define a slot 45. Portions 43 and 44 are formed integrally with a circumferential pole face portion 47. When assembled in the rotor as shown in FIGURES 1 and 2, the radial portions 43 and 44 are disposed on opposite sides of the flange 36 of the central member 19 of the rotor with the inner surface 48 of the inner radial member 43 in contact with the pole face 39 of one of the magnets 32 and with the adjacent end of the cylindrical member 33. The pole piece members 37 are retained in position by pins 50; each pin extends through openings 51 and 52 in the radially extending portions 43 and 44 and into an aligned opening 53 in the flange 36 in the member 19. It will be evident that these members provide low reluctance paths for magnetic flux from the ends of the magnets 32 to the pole face portions 47 of the pole piece members 37. The pole piece members are composed of low reluctance or highly permeable ferromagnetic materials such as cast, mild steel. The pins 50 are also preferably composed of a similar highly permeable material such as cold rolled mild steel.

The rotor is completed by an end plate 55 that is preferably composed of a non-magnetic material such as a non-magnetic stainless steel. The plate is annular in form and is welded as indicated at 56 to the outer edge of the radially extending portion 44 of each pole piece and is also welded as indicated at 57 to the stub shaft 17. The rotor assembly at the other end of the rotor is completed and a return path provided for the flux by an annular member 59, also composed of permeable ferromagnetic material such as mild steel, and preferably taking the form of a disc, as shown. Member 59 is threaded onto the central portion 19 of the rotor as indicated at 60, and is also preferably welded thereto as at 61.

If desired, the member 33 may be reinforced against centrifugal force by a steel or other high strength sleeve member 62 that surrounds the body 33. The sleeve 62 may be composed of non-magnetic stainless steel and preferably is welded at one end to the disc 59 and at the other end to the ends 63 and sides 64 of the pole face portions 47 of the pole piece members 37.

It will be evident that with this construction, a path for the magnetic flux is provided from, for example, the north pole of one magnet 32 through the radial portions 43 and 44 of the associated pole piece 37 and through the pin 50 to the pole face portion 47 of the pole piece. The flux crosses the air gap to the stator pole faces 38 and goes through the stator in the usual manner to the pole face 47 of the pole piece members 37 of the adjacent magnets which are disposed so that their ends are, in the example given, south poles. Upon rotation of the rotor, a voltage is generated in the output windings of the machine in the usual manner. The magnetic circuit is completed at the end of the rotor opposite the pole piece members by the plate 59 through which the flux travels between the opposite ends of the magnets 32.

It is to be noted that with this arrangement, the length of the magnets, and hence the amount of magnetic material that can be incorporated into the machine, and the magneto-motive force supplied by the magnets is not limited by the diameter of the rotor or the machine. Also, the area of the rotor pole faces can be increased as desired by extending the pole face portions 47 axially of the rotor to provide pole faces of any reasonable area.

The particular construction described is also advantageous in that the entire rotor assembly including the magnets is enclosed in a steel housing built up of the end discs 55 and 59, the sleeve member 62 and the pole face portions 47 of the pole piece members. All of these parts may be welded together to provide an impervious assembly that can be used for machines designed for severe environments and that can withstand high peripheral speeds. Furthermore, with the magnets properly designed and enclosed as in the preferred form shown herein, in a conductive metal such as aluminum, the rotor magnets cannot be demagnetized by short circuits of the machine. The rotor can be manufactured at reasonable cost since the cylindrical body member 33 can be die cast of aluminum with the magnets in place providing a tight assembly with an effective damper circuit.

In circumstances where the area of magnet that is desired is greater than can be provided by a single assembly of magnets because of the limits imposed by the diameter of the stator, the magnets can be arranged in pairs so that they extend in opposite directions from the central plane of the stator. An ararngement of this sort is shown in FIGURES 4, 5 and 6. Here the machine, indicated in general at 70, has a housing 71, diagrammatically indicated in broken lines, carrying bearings 72 and 73 that support the rotor shaft. The rotor shaft is made up of stub shaft members 74 and 75 that are secured to the central tubular rotor member 76. As before, shaft 75 is shown as broken away and ordinarily would be provided with means for driving the generator from an appropriate source of power.

The stator 77 is supported in the housing and, like the previously described stator, is made up of a track of laminations of iron or steel stampings and appropriate windings 78 having end turns 79. The stator pole faces are shown at 80. The stator of the generator is similar to that previously described except that it may be of greater axial dimensions.

In order to provide the desired field flux, pairs of axially extending magnets 82 are employed in this modification. The member 76 has a central radially disposed flange 83, on each side of which one magnet of a pair is situated. The magnets are arranged with their axes in alignment and so that the adjacent poles of magnets in a pair of like polarity. Thus, in the embodiment shown, the north poles of the magnets 82 at the upper part of FIGURE 4 are adjacent each other at the central portion of the machine, while the south poles of the magnets 82 at the bottom end of FIGURE 4 are adjacent each other at the central portion of the machine.

The magnets 82, as in the case of the previous modification, are preferably carried in a cast aluminum member 84 which is supported by the tubular member 76. The required pole faces are provided by pole piece members 85, there being one pole piece member for each pair of magnets. Each pole piece member has a pole face portion 86 that extends along the circumference of the rotor and from which there are inwardly extending radial portions 87. Each radially extending portion 87 abuts the end of adjacent magnet 82, as shown. The pole pieces 85 are secured in the rotor assembly by pins 88 that extend through appropriate openings in the flange 83 of the central member 76 and registering openings 90 in the radially extending portions 87. As before, the pole piece members are made of permeable ferromagnetic metal such as mild steel castings, and the pins are also of ferromagnetic material. As before, the assembly is completed by end discs 95 and 96 that are threaded on the ends of central portion 76 and that engage cup-shaped mild steel members 97 and 98. The discs 95 and 96 and the cup-shaped members 97 and 98 provide a highly permeable path for the return flux between the outer ends of the adjacent magnets 82. The rotor assembly preferably is reinforced and completed by stainless steel sleeves 100 on opposite sides of the central portion of the rotor, the inner ends of the sleeves being cut out as shown in FIGURE 4 to receive the pole face portions 86 of the pole piece members 85. If desired, the entire assembly can be secured by appropriate welds as indicated.

The operation of the generator of this modification is the same as that previously described. The field flux passes from the pole faces across the air gap, through the stator and back to a pole face of opposite polarity. As noted above, the magnetic circuit is completed at the outer ends of the magnets by the members 95, 96, 97 and 98. As in the previous form, the length of the magnets is not limited by the diameter of the rotor, and the pole face area can be made as desired without limitation because of the diameter of the machine. The construction shown in FIGURES 4, 5 and 6 is perhaps preferred for instances or situations where it is desired to have the maximum generator output per pound of weight.

From the foregoing description of preferred forms of the invention, it will be seen that the invention provides an improved permanent magnet generator of the radial air gap type in which the lengths of the magnets and therefore the strength of the field is not limited by the rotor diameter. In this respect, generators made according to the invention embody the advantages of formerly known axial air gap types. Also, in the present design, the pole faces can be made of required area without limitation because of the rotor diameter, and the stator can be of conventional laminated construction embodying conventional types of output windings. In this respect, the generators made according to the invention embody advantages previously known with respect to generators of the radial air gap type. Thus, the generators of the present invention eliminate the disadvantages and obtain the advantages of the prior known types of radial and axial air gap permanent magent generators.

The rotors can be made of high strength materials to withstand high peripheral speeds and can be enclosed in housings to protect them from adverse chemical environments. When the magnets and rotors are properly designed and enclosed, the magnets cannot be demagnetized by short circuits.

While two illustrative embodiments of the invention have been disclosed herein, those skilled in the art will appreciate that the principles of the invention can be employed in other embodiments without departing from the spirit and scope of the invention. The essential characteristics of the invention are defined in the appended claims.

I claim:

1. In a permanent magnet generator having a stator carrying output windings, a rotor disposed within the stator and supported for rotation with respect thereto, and permanent magnets carried by said rotor with their magnetic axes parallel to the rotor shaft for providing the flux field for the generator, the improvement which comprises the provision of a ferromagnetic pole piece member for each magnet, each pole piece member having a radially extending portion disposed adjacent the pole face of its associated magnet and a circumferentially extending pole face portion, the circumferentially extending pole face portions of the pole piece members being circumferentially spaced around the rotor, there being a radial air gap between the pole face portions of the pole piece members and the stator.

2. A generator according to claim 1 in which the pole faces of adjacent magnets are of opposite polarity and correspondingly the pole faces of adjacent pole piece members are of opposite polarity.

3. A generator according to claim 2 having a member composed of ferromagnetic material at the ends of the magnets opposite the pole piece members for providing and for completing the path for the magnetic flux.

4. A generator according to claim 1 wherein the permanent magnets are in one group with the ends of the magnets disposed in substantially the same radial plane and the pole piece members are all at one end of the rotor.

5. A generator according to claim 1 wherein the magnets are in two axially spaced groups and the pole piece members are disposed between the two groups of magnets.

6. A generator according to claim 5 wherein the radial portions of the pole piece members are disposed between a magnet of one group and the aligned magnet of the other group.

7. A generator according to claim 6 having discs of magnetic material disposed at opposite ends of the rotor and engaging the ends of the magnets opposite the centrally disposed pole piece members, there being a sleeve of non-magnetic material surrounding the rotor, the sleeve being cut away to receive the pole face portions of the pole piece members, the discs at the ends of the rotor being welded at their peripheries to the sleeve and the sleeve being welded to the edges of the pole face portions of the pole piece members whereby an enclosed impervious rotor is provided.

8. A generator according to claim 1 wherein the rotor comprises a cylinder composed of a non-magnetic material of high conductivity and mechanical strength, the magnets being disposed in axially extending holes in the cylinder.

9. A generator according to claim 8 wherein the pole piece members are disposed at one end of the rotor, there being a disc of non-magnetic material overlying the radial portions of the pole piece members, a disc of magnetic material engaging the opposite ends of the magnets, a sleeve of non-magnetic metal surrounding the rotor body, the sleeve being cut away to receive the pole face portions of the pole piece members, the disc adjacent the pole piece members being welded at its periphery to the pole face portions of the pole piece members, the sleeve being welded to the edges of the pole face portions of the pole piece members and the disc of magnetic material being welded at its periphery to the sleeve, whereby an enclosed impervious rotor is provided.

10. A generator according to claim 1 wherein the rotor comprises a central member having a radially extending flange and wherein the pole piece members each have two radially extending portions which between them define a slot, the radial portions of each pole piece member being disposed on opposite sides of the flange.

11. A generator according to claim 9 wherein the pole piece members are secured to the radial flange to retain them in position against the action of centrifugal force.

References Cited

UNITED STATES PATENTS

| 2,680,822 | 6/1954 | Brainard | 310—156 |
| 2,930,916 | 3/1960 | Scanlon | 310—156 |
| 3,303,371 | 2/1967 | Moressee | 310—156 |
| 3,383,534 | 5/1968 | Ebbs | 310—179 |

WARREN E. RAY, *Primary Examiner.*

R. SKUDY, *Assistant Examiner.*

U.S. Cl. X.R.

310—46, 261